(12) United States Patent
Eberl et al.

(10) Patent No.: US 6,265,791 B1
(45) Date of Patent: Jul. 24, 2001

(54) DEVICE FOR CONTACTLESS TRANSMISSION OF ELECTRIC ENERGY

(75) Inventors: Bernhard Eberl, Augsburg; Eberhard Vonhof, Weil am Rhein, both of (DE)

(73) Assignee: Wampfler Aktiengesellschaft (DE)

(*) Notice: Subject to any disclaimer, the term of this patent is extended or adjusted under 35 U.S.C. 154(b) by 0 days.

(21) Appl. No.: 09/284,592
(22) PCT Filed: Aug. 6, 1998
(86) PCT No.: PCT/EP98/04899
  § 371 Date: Jun. 7, 1999
  § 102(e) Date: Jun. 7, 1999
(87) PCT Pub. No.: WO99/09633
  PCT Pub. Date: Feb. 25, 1999

(30) Foreign Application Priority Data

Aug. 19, 1997 (DE) .............................. 197 35 685

(51) Int. Cl.⁷ ...................................... H01F 27/34
(52) U.S. Cl. ............................ 307/104; 307/125; 191/10
(58) Field of Search ............................ 191/10; 363/104, 363/173; 336/178; 318/558; 307/104, 7, 17, 125

(56) References Cited

U.S. PATENT DOCUMENTS

| | | | |
|---|---|---|---|
| 4,836,344 * | 6/1989 | Bolger ................................. | 191/10 |
| 5,293,308 * | 3/1994 | Boys et al. ............................ | 363/37 |
| 5,311,973 * | 5/1994 | Tseng et al. .......................... | 191/10 |
| 5,528,113 * | 6/1996 | Boys et al. ............................ | 318/16 |
| 5,619,078 * | 4/1997 | Boys et al. ............................ | 307/85 |
| 5,821,638 * | 10/1998 | Boys et al. ......................... | 307/104 |
| 5,938,151 * | 8/1999 | Takasan et al. ...................... | 191/10 |

* cited by examiner

*Primary Examiner*—Josie Ballato
*Assistant Examiner*—Roberto Rios
(74) *Attorney, Agent, or Firm*—Larson & Taylor, PLC

(57) ABSTRACT

An energy transmission device allows several consumers to be supplied with energy independent of one another and provides contactless transmission of energy from a primary current line, through which alternating current flows, to a number of secondary, resident load circuits with at least one coil, each of which draws energy from the electromagnetic field of the current lead. An auxiliary line runs parallel to the current lead and it is connected with the current lead via several connecting points in order to conduct current from a first connecting point via the auxiliary line to a second connecting point. In at least one section of the line, between two connecting points, an adjustable impedance is provided in the auxiliary line which is controlled by a monitoring device in order to prevent blocking of the line by a disconnected consumer.

26 Claims, 2 Drawing Sheets and closed under control of the monitoring device 43.

DEVICE FOR CONTACTLESS TRANSMISSION OF ELECTRIC ENERGY

FIELD OF THE INVENTION

The present invention concerns an energy transmission device for the contactless transmission of energy from a primary current line (2), through which alternating current flows, to a number of secondary, resonant load circuits (100, 200) with at least one coil (5) each which draws energy from the electromagnetic field of the current lead (2).

BACKGROUND OF THE INVENTION

Energy transmission devices of this type are used to transmit electric energy from a stationary current lead of a primary circuit to the secondary circuit of a mobile consumer Possible applications are, for example, in industrial assembly conveyor systems or passenger vehicles.

In these situations the contactless inductive energy transmission is advantageous. It avoids the use of sliding contacts that are prone to wear. Moreover, difficulties are avoided with respect to protecting exposed lines when installing the current lead on the floor and poor contacting due to contaminated lines. By installing the lines in the floor, ceiling or walls, the danger of contacting of previously conventional current-carrying rails can be eliminated.

Known systems can be problematic in the event of simultaneous use by several consumers. The cause of this is the interaction between consumer and the stationary current lead.

In normal operation, an alternating current flows through the primary circuit. The secondary circuit of the consumer forms an oscillating circuit that is coupled with the primary circuit via the coil of the oscillating circuit and resonates at the frequency of the primary circuit.

If a consumer is drawing little energy from the primary circuit, then this means an increased impedance in the load circuit. This impedance is mirrored in the primary circuit by the transformer effect. Due to this increased impedance in the primary circuit, the flow of current through the primary circuit is impeded and thus the supply for other consumers is reduced. If no energy is used, then the coil of a consumer can completely block the flow of current in the primary conductor. Thus, further consumers cannot be operated independently of the first consumer and not individually regulated in their power consumption.

One attempt to overcome this problem can be found in the patent PCT 92/17929. In this case, an electric or mechanical decoupling device is installed on each consuming device. However, this concept requires that, for example, a large-scale decoupling device, e.g. a hydraulic piston, be transported on consumer vehicles.

WO 93/23909 describes a system in which the primary circuit has guidance loops arranged behind one another in the direction of travel. These guidance loops are bypassed and thus not traversed by current if there is no consumer in the area of its electric field. However, this concept does not offer a solution for the operation of several consumers since, in this case, parts of lines not used are not to be disconnected but, instead, several consumers are to be supplied in spite of a blocked primary line.

SUMMARY OF THE INVENTION

Thus, it is the object of the invention to design an energy transmission device of this type in such a way that several consumers can be easily supplied with energy independent of one another.

The object is solved by an auxiliary line that runs parallel to the current lead and is connected with the current lead via several connecting points in order to be able to conduct the current from a first connecting point via the auxiliary line to a second connecting point and that at least in one section of the line, between two connecting points, an adjustable impedance is provided in the auxiliary line which is controlled by a monitoring device in order to prevent blocking of the line by a disconnected consumer.

BRIEF DESCRIPTION OF THE DRAWINGS

An example of an embodiment will be described in detail in the following with reference to the accompanying drawings, showing.

DETAILED DESCRIPTION OF THE INVENTION

Figure 1:
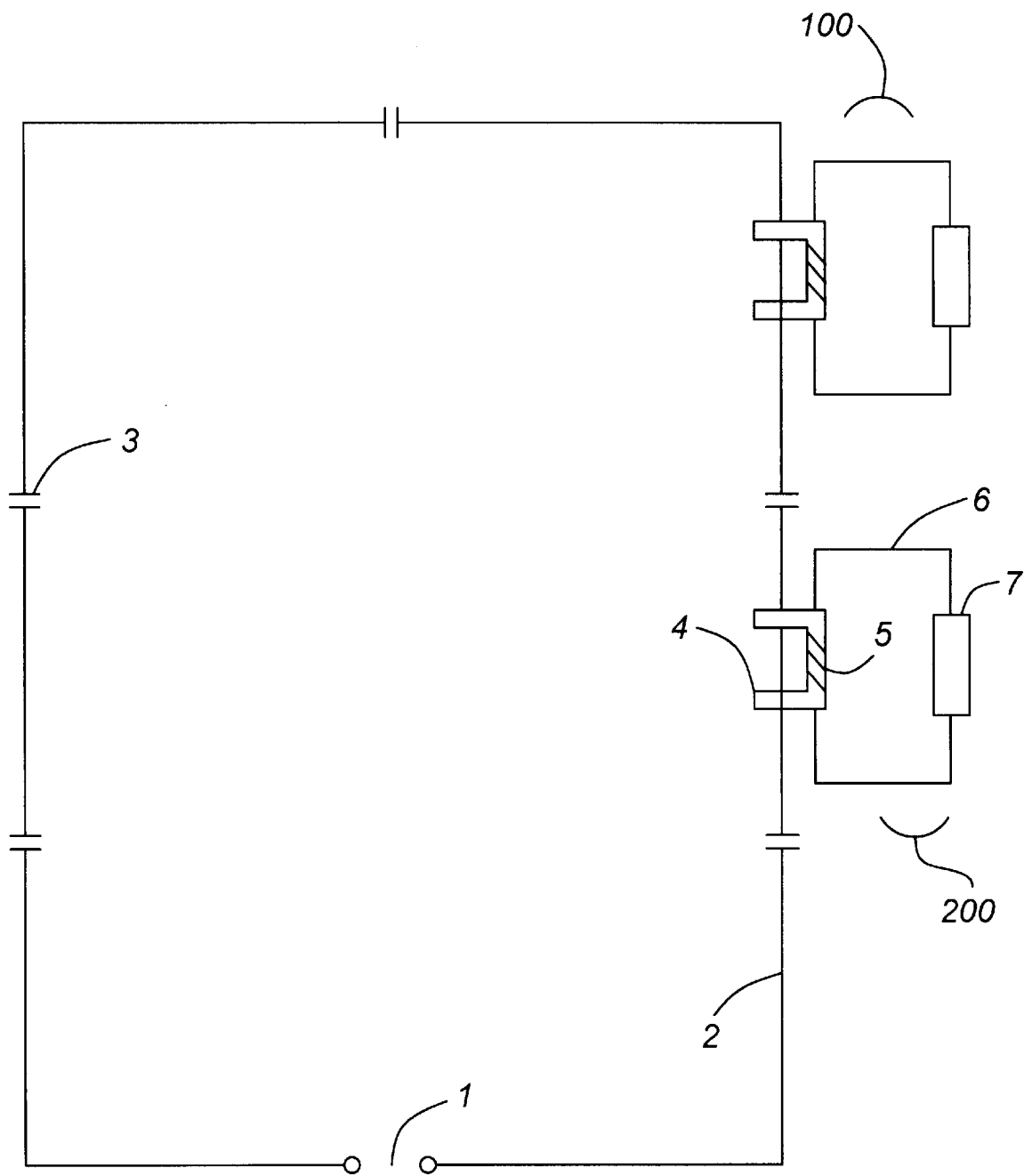
FIG. 1 an inductive energy transmission system according to the prior art

As shown in FIG. 1 an energy transmission device according to the prior art has a primary circuit with a current lead 2 that is supplied with energy via an alternating voltage source 1. For the resonant operation of the circuit, capacitors 3 are integrated into the current lead 2 at specific intervals.

To draw energy from the primary circuit, the current consuming devices of electric current 100 and 200 each have a coil 5 that is wound, for example, about a U-shaped ferrite core 4. This coil 5 is connected with a consumption impedance 7 via current leads 6. This consumption impedance 7 can, for example, be a vehicle motor or a regulating circuit. Furthermore, the secondary circuit has a device acting like a capacitor that is applied to the coil 5 parallel to the consumption impedance 7. This is necessary so that the secondary circuit can form a resonant circuit. However, for the sake of clarity, the illustration of the capacitor has been omitted.

If a high-frequency alternating voltage is applied to the voltage source 1, then an alternating current flows through the current lead 2. An electromagnetic field forms about the said current lead 2. It results in a load shift in the coil 5 due to the magnetization of the U-shaped ferrite core. The high-frequency change in direction of the current in the current lead 2 results in a constant reversal of the electromagnetic field and thus in a resonant change in direction of the load shifts in the coil 5. The alternating current thus induced can be led to a consumption impedance 7 via the leads 6.

Figure 2:
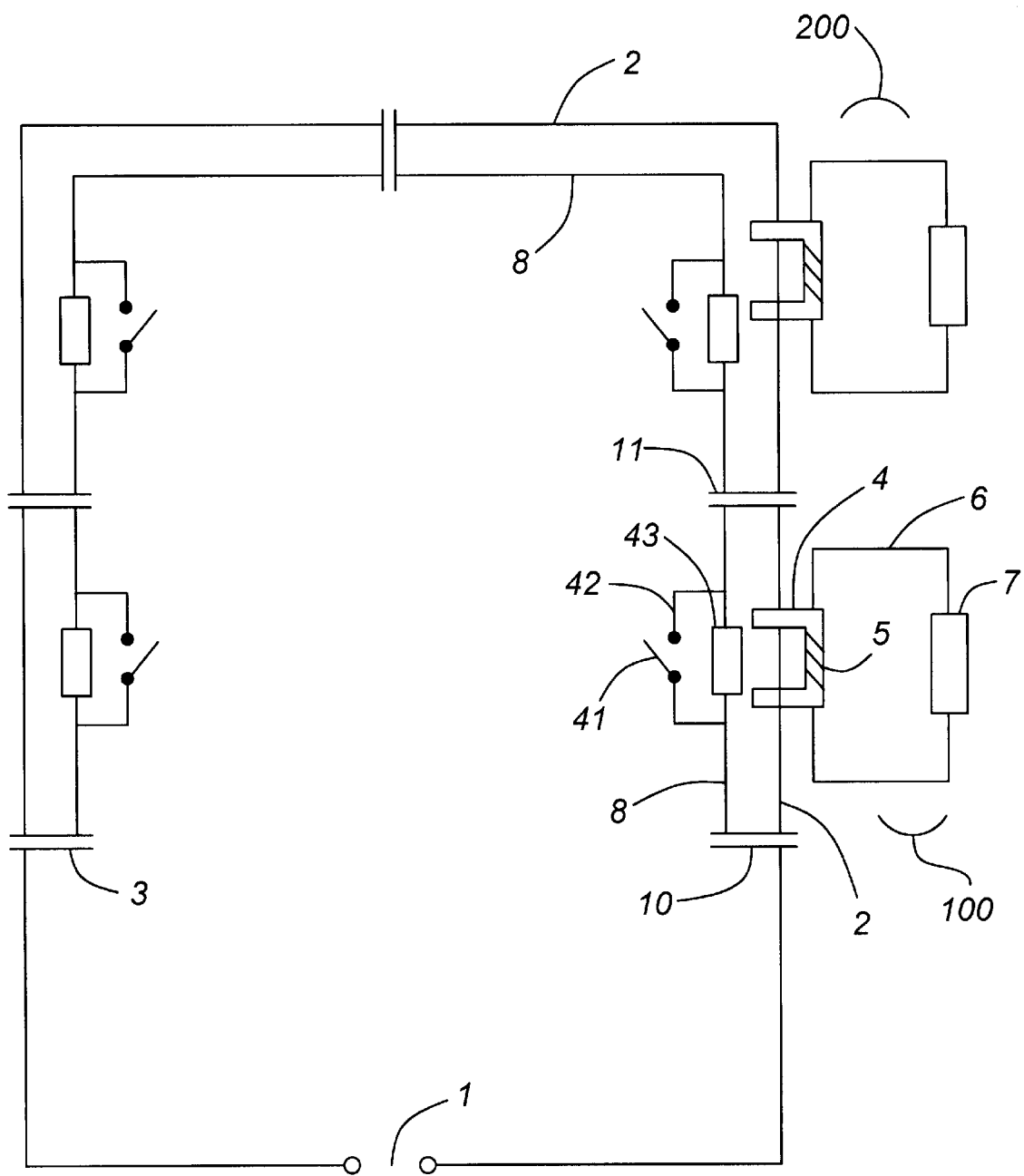
FIG. 2 an energy transmission device according to the present invention.

FIG. 2 illustrates an energy transmission device according to the present invention. The system uses the current consuming devices (100, 200) and parts of the primary circuit according to the prior art of FIG. 1. The same components are designated with the same numbers as in FIG. 1.

The system has a primary current lead 2 with an alternating voltage source 1. An auxiliary line 8 runs parallel to the current lead 2. This auxiliary line 8 is connected with the current lead 2 at specific intervals at connecting points 10, 11. In the present example, the capacitors 3 were selected as connecting points. A monitoring device 43 is provided in the auxiliary line 8 between two of these connecting points respectively. Parallel to each monitoring device 43, a current branch 42 with a switch 41 is allocated which can be opened and closed under control of the monitoring device 43.

If a consumer 100 requires the maximum power from the current lead 2, then the monitoring device 43 of each section in question between two adjacent connecting points 10, 11 switches the switch 41 into the open state. In this way, the current cannot flow through the auxiliary line 8 since both the monitoring device 43 and the open switch 41 do not conduct. In this case, the entire current flows only through the current lead 2 and thus through the coil 5 of the consumer 100.

If a consumer 100 requires a lower power output, then the monitoring device 43 closes the switch 41. As a result, the current flows not only via the current lead 2 but also via the auxiliary line 8 and the branch line 42. In this way, the current can flow from the first connecting point 10 both via the current lead 2 and via the current lead 8 and branch line 42 to the next connecting point 11. The field of the current lead 2 is thus less intense and the power transmitted lower.

To continuously regulate the power of the consumer, the switch 41 can be closed in a timed manner. By regulating the pulse frequency or the keying ratio, the output values can be set between a maximum transmission when the switch is open continually and a minimum transmission when the switch is closed continually.

To avoid blocking the line 2 by a consuming device 100 which is disconnected, the switch 41 can be permanently closed. In this way, the entire current is transmitted via the auxiliary line 8 and the branch line 42 to the next connecting point 11 in the section 10–11.

A change in the power required by the consumer reacts on the primary circuit. As a result, the switch 41 can be controlled by the monitoring device 43 by measuring the voltage or a minimum testing current flow in the local auxiliary line section 8. With preset deviation values, the monitoring device 43 then generates switching pulses to switch 41.

Another possibility for controlling the switch 41 lies in the transmission of signals from the consumer 100 itself to the monitoring device 43. For this purpose, contactless data transmission devices are provided on the consumer 100, 200 and the monitoring devices 43. These can operate inductively, via radio or in accordance with other conventional methods known in the art.

In this case, a separate monitoring device 43 can be provided for each line section 8 respectively, as shown in FIG. 2. However, it is also possible to control several sections jointly from a central monitoring device. To accomplish this, the consumers 100, 200 would send, for example, their signals to the common monitoring device 43. This monitoring device could then switch the respective switch 41 according to the requirements.

In an alternative embodiment variable regulating impedance can be substituted for the switch 41. In this case, the current flow via the auxiliary line sections 8 would then be regulated by adjusting the level of an adjustable resistance and not by opening or closing a switch which is functionally the same.

Since the described power control is always relative to a section, it is advisable to adapt the size of the sections to the size of the consumers 100, 200. Another possibility for the independent control of the individual consumers 100, 200 would be to maintain a sufficient operating interval.

What is claimed is:

1. A device for the contactless transmission of energy from a primary current line, through which alternating current flows, to a number of secondary, resonant load circuits with at least one coil each of which draws energy from the electromagnetic field of the current line, the device comprising an auxiliary line running parallel to the current line and connected with the current line via several connecting points for conducting the current from a first connecting point via the auxiliary line to a second connecting point, an adjustable resistance in at least one section of the auxiliary line, between two connecting points, and a monitoring device for controlling said adjustable resistance in order to prevent blocking of the line by a disconnected consumer, the monitoring device monitoring the voltage on the adjustable resistance of at least one line section and generating control pulses for the adjustable resistance at specific changes in value.

2. The device according to claim 1 wherein the adjustable resistance is formed by a switch that can be closed or opened respectively to switch the auxiliary line to conducting or non-conducting.

3. The device according to claim 1 wherein the connecting points are in the form of capacitors.

4. The device according to claim 2 wherein the switch is closed in a pulsed manner to control the power consumption of a consumer.

5. Device according to claim 1, wherein the monitoring device monitors a testing current flow in at least one line section of the auxiliary line and generates control pulses for an adjustable resistance at specific changes in value.

6. Device according to claim 1, wherein at least one consumer has a device for contactless signal transmission.

7. Device according to claim 1, wherein a monitoring device receives signals from a consumer transmitted in a contactless manner and generates control pulses for at least one adjustable resistance in dependency thereon.

8. Device according to claim 1, wherein a monitoring device receives signals from several consumers and simultaneously controls several adjustable resistances.

9. Device according to claim 1, wherein a separate monitoring device for controlling the local adjustable resistance is allocated to at least one line section.

10. A device for the contactless transmission of energy from a primary current line, through which alternating current flows, to a number of secondary, resonant load circuits with at least one coil each of which draws energy from the electromagnetic field of the current line, the device comprising an auxiliary line running parallel to the current line and connected with the current line via several connecting points for conducting the current from a first connecting point via the auxiliary line to a second connecting point, an adjustable resistance in at least one section of the auxiliary line, between two connecting points, and a monitoring device for controlling said adjustable resistance in order to prevent blocking of the line by a disconnected consumer, the monitoring device monitoring the current flow in at least one line section of the primary current line and generating control pulses for said adjustable resistance at specific changes in value.

11. The device according to claim 10 wherein the adjustable resistance is formed by a switch that can be closed or opened respectively to switch the auxiliary line to conducting or non-conducting.

12. The device according to claim 10 wherein the connecting points are in the form of capacitors.

13. The device according to claim 11 wherein the switch is closed in a pulsed manner to control the power consumption of a consumer.

14. Device according to claim 10, wherein the monitoring device monitors a testing current flow in at least one line section of the auxiliary line and generates control pulses for an adjustable resistance at specific changes in value.

15. Device according to claim 10, wherein at least one consumer has a device for contactless signal transmission.

16. Device according to claim 10, wherein a monitoring device receives signals from a consumer transmitted in a contactless manner and generates control pulses for at least one adjustable resistance in dependency thereon.

17. Device according to claim 10, wherein a monitoring device receives signals from several consumers and simultaneously controls several adjustable resistances.

18. Device according to claim 10, wherein a separate monitoring device for controlling the local adjustable resistance is allocated to at least one line section.

19. A device for the contactless transmission of energy from a primary current line, through which alternating current flows, to a number of secondary, resonant load circuits with at least one coil each of which draws energy from the electromagnetic field of the current line, the device comprising an auxiliary line running parallel to the current line and connected with the current line via several connecting points for conducting the current from a first connecting point via the auxiliary line to a second connecting point, an adjustable resistance in at least one section of the auxiliary line, between two connecting points, and a monitoring device for controlling said adjustable resistance in order to prevent blocking of the line by a disconnected consumer, the monitoring device monitoring the testing current flow in at least one line section of the auxiliary line and generating control pulses for an adjustable resistance at specific changes in value.

20. The device according to claim 19 wherein the adjustable resistance is formed by a switch that can be closed or opened respectively to switch the auxiliary line to conducting or non-conducting.

21. The device according to claim 19 wherein the connecting points are in the form of capacitors.

22. The device according to claim 20 wherein the switch is closed in a pulsed manner to control the power consumption of a consumer.

23. Device according to claim 19, wherein at least one consumer has a device for contactless signal transmission.

24. Device according to claim 19, wherein a monitoring device receives signals from a consumer transmitted in a contactless manner and generates control pulses for at least one adjustable resistance in dependency thereon.

25. Device according to claim 19, wherein a monitoring device receives signals from several consumers and simultaneously controls several adjustable resistances.

26. Device according to claim 19, wherein a separate monitoring device for controlling the local adjustable resistance is allocated to at least one line section.

* * * * *